Patented Oct. 11, 1932

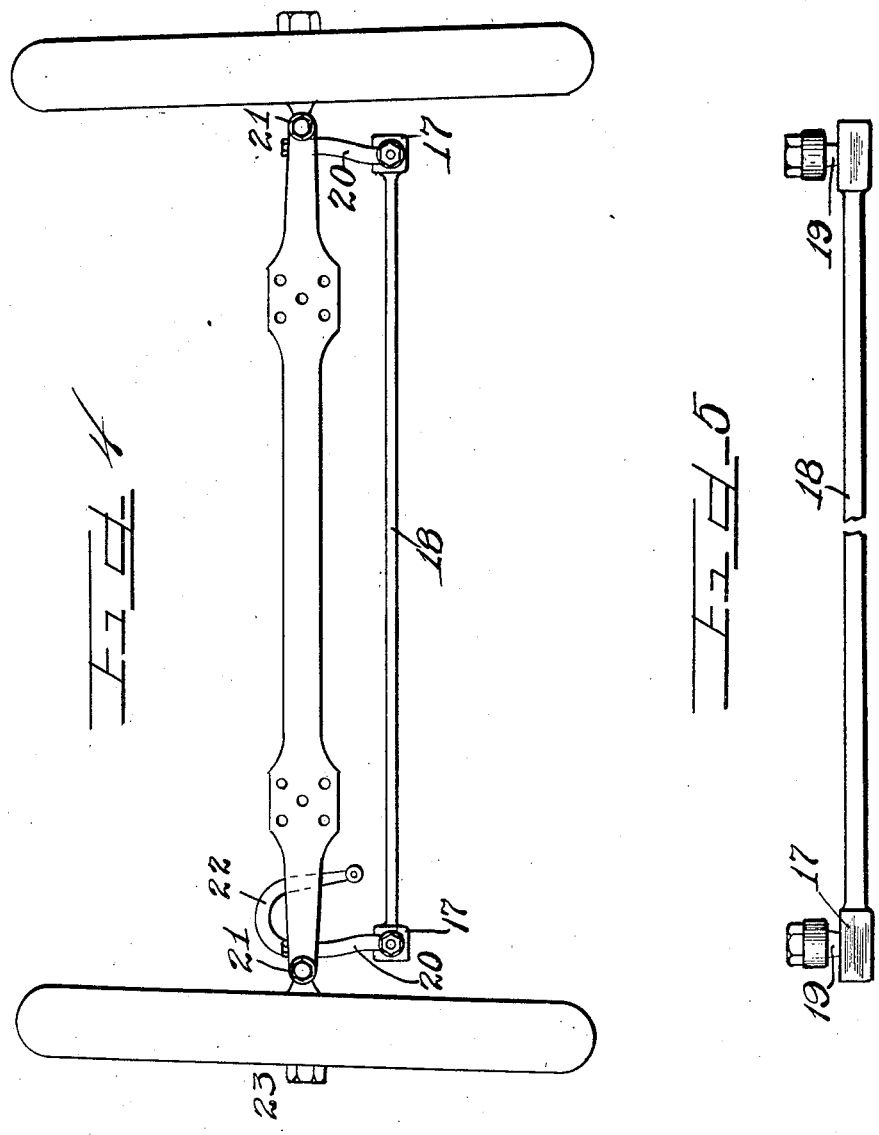

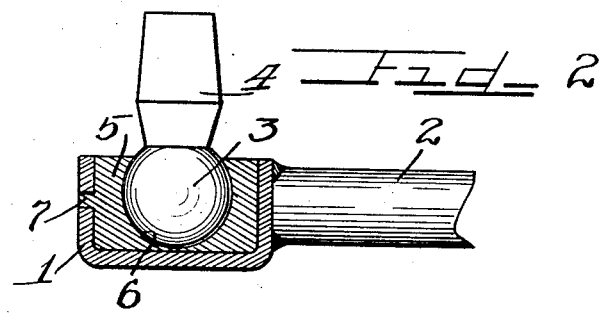
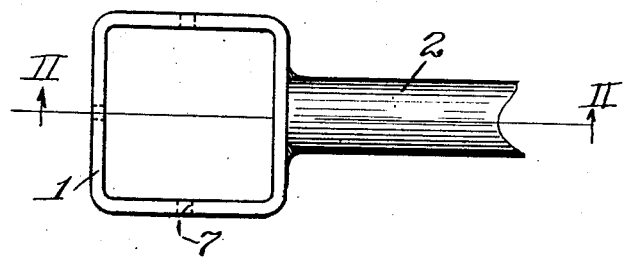
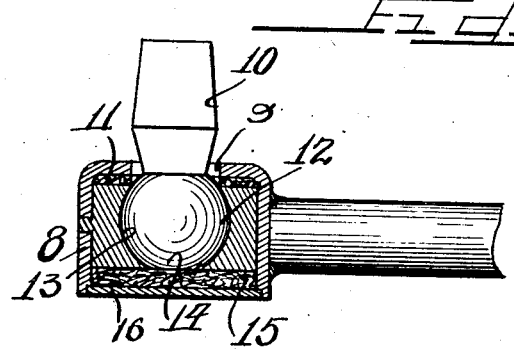

1,881,601

UNITED STATES PATENT OFFICE

GEORGE H. HUFFERD AND MATTHEW P. GRAHAM, OF DETROIT, MICHIGAN, ASSIGNORS TO THOMPSON PRODUCTS, INCORPORATED, OF DETROIT, MICHIGAN, A CORPORATION OF OHIO

BALL JOINT

Application filed June 5, 1929. Serial No. 368,540.

This invention relates to a ball joint for shock absorber links, tie rods, and the like.

It is an object of this invention to provide a simple ball joint structure having many advantages with respect to ease of assembly and cheapness of manufacture.

It is a further important object of this invention to provide a ball joint wherein the relative position and alignment of the members forming the linkage of which the ball joint is a part may be readily and quickly effected with such members of the linkage in their desired relative position.

Other and further important objects of this invention will become apparent from the following description taken in connection with the accompanying drawings in which:

Figure 1 is a plan view of the end of a shock absorber link, tie rod, or the like.

Figure 2 is a sectional view taken substantially on line II—II of Figure 1, with parts in elevation.

Figure 3 is a sectional view showing a modified form of our invention, with parts in elevation.

Figure 4 is a top plan view illustrating our invention in connection with the steering mechanism of an automotive vehicle.

Figure 5 is an enlarged broken elevational view of a tie rod provided with ball joints of our invention.

In Figures 1 and 2, the reference numeral 1 indicates a bearing socket, preferably rectangular in shape, formed on the end of a shock absorber link 2, tie rod, or the like, or suitably secured thereto, as by welding. A ball 3 of a ball stud 4 is suitably positioned within the socket 1 and a metal bearing composition 5 poured into the socket 1 around the ball 3 to provide a bearing surface 6 therefor. If desired, the ball 3 may first be covered with grease and the bearing metal, such as babbitt or the like, poured in around the ball. The ball joint may likewise be provided wth any suitable type of special lubricating system or fitting. The bearing socket 1 may then be covered with a plate if desired. In order to prevent the bearing composition 5 from becoming loose and rattling or falling out of the bearing socket 1, one or more apertures 7 is provided in the wall of said socket 1 into which the bearing composition extends and provides a lock between the bearing composition and the socket member.

If the metal bearing composition becomes worn, and experiments seem to indicate that wear becomes appreciable after fifteen or twenty thousand miles of use, the bearing surface may be reformed by merely softening the metal bearing composition with a blow torch or the like and pouring in a little more of the bearing composition, or letting that which is in the socket again heat itself around the ball.

In Figure 3 there is shown a modified form of bearing socket 8 having an opening 9 through which the stud 10 of a ball stud is adapted to extend. A felt washer 11 is positioned inside of said socket 8 surrounding the aperture 9. While in inverted positions, the ball 12 is dropped onto the felt washer 11 and bearing metal composition poured in around the ball to completely fill the socket in form bearing surfaces 13 for said ball. The bottom of said ball 12 may be suitably flattened as at 14 and another felt washer 15 seated against the flattened end of the ball. The socket may then be closed by a suitable plate 16, welded or otherwise secured to the walls of said socket.

In this form of our invention, the felt washers 11 and 15 may be impregnated with a lubricant and thus serve to lubricate the bearing surfaces between the ball and bearing compositions.

Figure 4 illustrates the application of our invention to a method of aligning the front wheels of an automotive vehicle. A ball joint assembly 17 of the type previously described, is provided at each end of a tie rod 18 connected through the ball stud 19 by means of steering knuckle arms 20 to steering knuckles 21. A steering knuckle gear rod arm 22 is connected to one of the steering knuckles 21 in the usual manner. After the wheels 23 have been provided with a proper degree of toe-in, and while the steering knuckle arms and toe rods are in the proper relative position, babbitt or other suitable metal bearing composition is poured into the sockets of the bearing assembly 17 and allowed to harden.

It is thus possible by the application of our invention to save a considerable amount of time in lining up the front wheels in an automotive vehicle with the elimination of the necessity of shims, turnbuckles, and the like. It will be understood, of course, that the advantages of our invention also accrue in other types of assembly, as for instance in assembling the linkages of a shock absorber.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. A ball joint comprising a rectangularly shaped socket member, a ball of a ball stud positioned therein, a lubricant carrying washer in contact with a portion of the surface of said ball and a poured metal composition filling said socket and forming a bearing surface for said ball.

2. A ball joint comprising a ball stud, a socket member for receiving the ball of said ball stud having an aperture in the top thereof through which the shank of said stud projects, a poured bearing composition seat in said socket member embracing said ball stud, lubricating gaskets in the upper and lower ends of said socket member and a closure plate sealing the lower end of said socket member.

3. A ball joint comprising a ball stud, a socket member for receiving the ball of said stud having an aperture in the top thereof through which the shank of said stud projects, a poured bearing composition seat in said socket member embracing said ball stud, said socket member having apertures into which said composition extends to prevent displacement of said composition from said socket member, lubricating gaskets in the upper and lower ends of said socket member and a closure plate sealing the lower end of said socket member.

4. A ball joint comprising a housing, a socket member formed of a poured bearing composition filling said housing, a ball of a ball stud mounted in said socket and a lubricant carrying washer in said housing and in contact with a portion of the surface of said ball.

In testimony whereof, we have hereunto subscribed our names at Detroit, Wayne County, Michigan.

GEORGE H. HUFFERD.
MATTHEW P. GRAHAM.